(No Model.)
T. R. WHITE.
GATE.
No. 596,465. Patented Dec. 28, 1897.
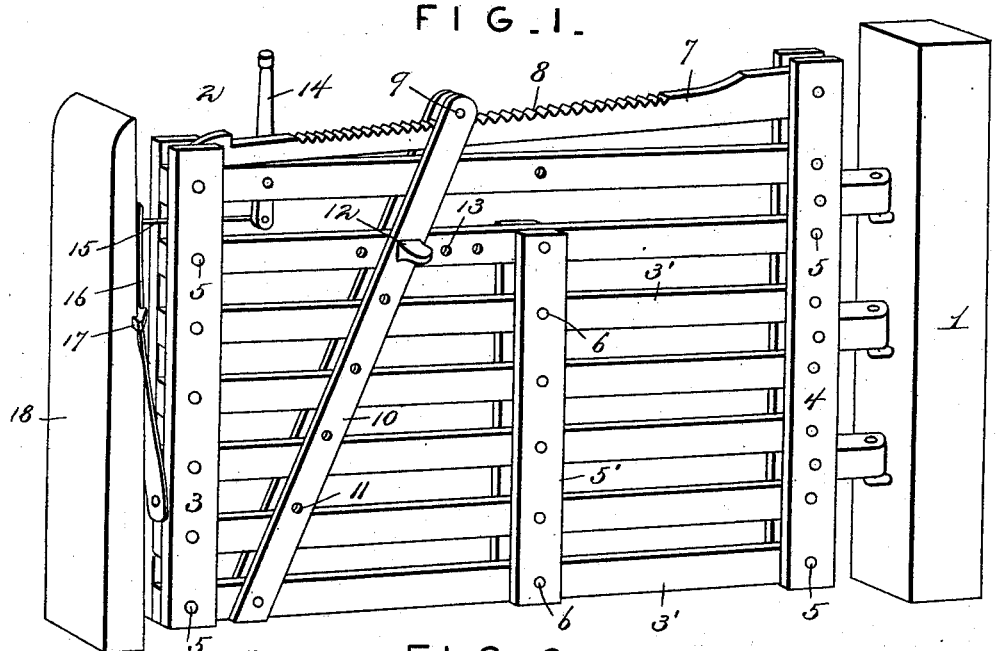
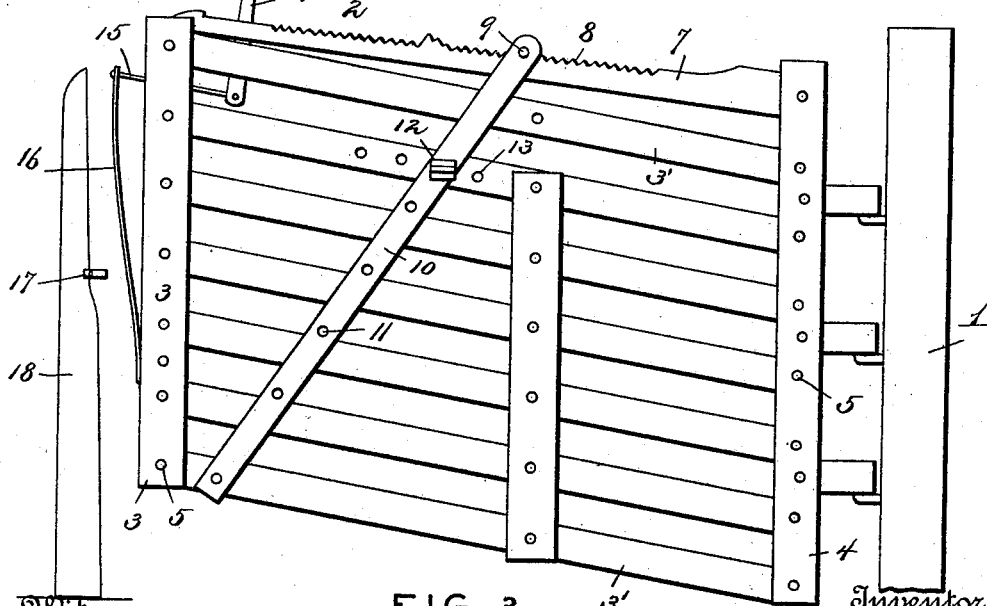
Witnesses
Harry L. Ames.
Victor J. Evans.
Inventor
Thomas R. White.
By John Wedderburn.
Attorney

UNITED STATES PATENT OFFICE.

THOMAS RITCHERSON WHITE, OF FINCASTLE, VIRGINIA, ASSIGNOR OF ONE-HALF TO JOSEPH B. BUHRMAN, OF GALA, VIRGINIA.

GATE.

SPECIFICATION forming part of Letters Patent No. 596,465, dated December 28, 1897.

Application filed September 4, 1897. Serial No. 650,623. (No model.)

*To all whom it may concern:*

Be it known that I, THOMAS RITCHERSON WHITE, a citizen of the United States, residing at Fincastle, in the county of Botetourt and State of Virginia, have invented certain new and useful Improvements in Gates; and I do hereby declare the following to be a full, clear, and exact description of the invention, such as will enable others skilled in the art to which it appertains to make and use the same.

This invention relates to a novel gate, and has for its object the production of a simple and durable gate which may be manufactured at slight cost and which will be susceptible of ready adjustment to compensate for sagging or other distortion of the parts and to prevent binding of the gate when swung and which may be adjusted to accommodate any inclination—as, for instance, when it is desired to employ the gate upon a hillside. Subordinate to this general object is the provision of means for effectually retaining the gate in its proper horizontal position and for preventing the accidental releasing of the adjusting mechanism, which would cause the gate to be improperly adjusted above or below the horizontal.

To the accomplishment of these objects the invention consists in forming a gate from a series of vertical standards pivotally connected to a vertically-arranged series of horizontal bars and in providing a rack-bar pivoted at the upper corner and the hinged end of the gate and provided with two longitudinal series of notches separated by a projection having one or more notches in its upper face in a higher plane than the series of notches just referred to. The notches upon the rack-bar are designed to be engaged by a transverse pin 9, carried at the upper end of obliquely-arranged locking-bars pivoted at their lower ends at the lower forward corner of the gate. When the gate is in its proper horizontal position, the transverse pin engages the intermediate series of notches and the locking-bar is locked by mechanism to be described. When, however, it is desired to adjust the gate to cause it to assume an upward or a downward inclination, as the case may be, the locking-bars are released and are swung in one direction or the other to cause the transverse pin to engage the notches of one or the other of the series upon opposite sides of the intermediate notches. The notched projection of the latch-bar performs a double function, inasmuch as it receives the transverse pin when the gate is in its initial position, and when the pin is in engagement with either series of notches upon opposite sides of the projection the latter prevents the accidental displacement of the transverse pin from one series of notches to the other—as, for instance, when a small animal endeavors to burrow under the gate and raises it sufficiently to release the pin from the notches.

My invention further consists in certain novel details of construction and in the arrangement of parts to be hereinafter described.

Referring to the drawings, Figure 1 represents a perspective view of a gate embodying my invention. Fig. 2 represents a side elevation of a gate, showing the same raised. Fig. 3 is a perspective view of the key for securing a gate in elevated position.

Referring to the numerals on the drawings, 1 indicates the end post, upon which is adapted to swing the gate 2, comprising end bars 3 and 4, said bars being formed of two members arranged parallel to each other, and horizontal rails 3', having their ends pivoted between said bars, as indicated by the numeral 5. At or about the center of the rails 2, on opposite sides thereof, I provide vertical members 5', which have pins 6 passing therethrough and through all of the horizontal rails except the top one.

Pivoted between the vertical members comprising the bar 4, adjacent to the hinges, is what may be termed a "rack-bar" 7, provided upon its upper edge with two series of notches 8 and 8ª, which extend nearly to the opposite ends of the rack-bar and are separated by a projection 8ᵇ, provided with one or more notches 8ᶜ. The notches of the several series upon the rack-bar are designed to be engaged by a transverse locking-pin 9, extending horizontally between the upper ends of two obliquely-arranged locking-bars 10, which are pivoted at their lower extremities on opposite sides of the gate adjacent to the front end of the lower horizontal rail. The locking-bars are provided with apertures 11 for the reception of a pin 12, adapted to enter one of a longitudinal series of correlative apertures 13 in one of the longitudinal bars of the gate.

Secured to the top rail near the free end of the gate is a lever 14, which is pivoted to said rail and adapted to be rocked through the medium of a rod 15, connected to the upper end of a spring 16, which has its lower end connected to the front edge of the free end of the gate, and it will be noted that when the lever is rocked the spring is drawn out of the catch 17 on the gate-post 18.

In operation, assuming the gate to be in the horizontal or initial position, as indicated in Fig. 1 of the drawings, the gate may be unlatched and swung in either direction. If now the gate-post 1 should sag, the front end of the gate would be correspondingly lowered and would bind upon the ground. In order to compensate for the sagging or distortion, it is simply necessary to remove the pin 13 and swing the locking-bar to bring the locking-pin into engagement with the proper notch of the series 8. The locking-bars constitute in effect a diagonal tie, and the gate is retained in its adjusted position, the adjustment of course being proportionate to the inclination of the locking-bars. If, on the contrary, it is desired to employ the gate on a hillside when a downward inclination is necessary in order to accommodate the gate to the vertical fence-posts, the locking-bar instead of being swung into engagement with the series 8 is thrown forward to engage the notches of the series 8ª upon the opposite side of the projection, and as these notches extend nearly to the front end of the gate it will be seen that a wide range of adjustment is contemplated. The notched projection intermediate of the series of notches 8 and 8ª is provided particularly for the purpose of permitting the gate to be used without the pin 13 and its receiving-apertures, as said projection will, in the manner stated, prevent the accidental movement of the locking-pin upon the rack-bar, except with respect to that particular series with which it may be in normal engagement.

It will thus be observed that I have produced a simple and efficient gate which may be adjusted to compensate for sag or distortion or permit the use of the gate upon a hillside or to allow its adjustment to facilitate the passage of small stock thereunder.

Having thus described my invention, what I claim as new, and desire to secure by Letters Patent, is—

1. In a gate, the combination with vertical bars and horizontal rails pivotally connected thereto, of a rack-bar pivoted at one end and extending longitudinally above the gate, and provided with two series of notches separated by a projection, and an oblique locking-bar pivoted at its lower end to the gate and provided with a transverse locking-pin designed to engage the notches upon the rack-bar, substantially as specified.

2. In a gate, the combination with the vertical bars and longitudinal rails pivoted thereto, of a longitudinally-disposed rack-bar terminally pivoted adjacent to the hinged end of the gate and provided with two series of notches separated by a toothed projection, an obliquely-disposed locking-bar pivoted at its lower end to the gate and provided with a transverse pin and designed to engage the notches in the rack-bar, and a securing-pin designed to engage an aperture in the locking-bar, and one of a series of apertures in one of the horizontal rails, substantially as specified.

In testimony whereof I have signed this specification in the presence of two subscribing witnesses.

THOMAS RITCHERSON WHITE.

Witnesses:
JAMES GODWIN,
CHARLES J. HEDRICK.